US006995683B2

(12) United States Patent
Smithson et al.

(10) Patent No.: US 6,995,683 B2
(45) Date of Patent: Feb. 7, 2006

(54) SYSTEM AND METHOD FOR TRANSMITTING DOWNHOLE DATA TO THE SURFACE

(75) Inventors: Mitchell C. Smithson, Pasadena, TX (US); Robert Cloud, Houston, TX (US); David O. Adams, The Woodlands, TX (US); Corrado Giuliani, Milltimber (GB)

(73) Assignee: WellDynamics, Inc., Spring, TX (US)

( * ) Notice: Subject to any disclaimer, the term of this patent is extended or adjusted under 35 U.S.C. 154(b) by 0 days.

(21) Appl. No.: 10/799,840

(22) Filed: Mar. 12, 2004

(65) Prior Publication Data

US 2005/0200497 A1 Sep. 15, 2005

(51) Int. Cl.
*G01V 3/00* (2006.01)

(52) U.S. Cl. .............................. 340/853.2; 340/853.1; 340/870.11; 340/870.13; 166/250.17; 370/442

(58) Field of Classification Search ........... 166/250.07, 166/250.17; 340/853.1, 853.2, 855.3, 855.4, 340/870.11, 870.13, 870.14; 370/442
See application file for complete search history.

(56) References Cited

U.S. PATENT DOCUMENTS

| | | | | |
|---|---|---|---|---|
| 3,986,162 | A | * | 10/1976 | Cholez et al. ................. 367/79 |
| 4,053,714 | A | * | 10/1977 | Long ..................... 340/870.14 |
| 4,509,170 | A | * | 4/1985 | Hollinger et al. ........... 370/458 |
| 4,547,774 | A | | 10/1985 | Gould |
| 4,589,285 | A | | 5/1986 | Savit |
| 4,616,702 | A | | 10/1986 | Hanson et al. |
| 4,628,493 | A | * | 12/1986 | Nelson et al. ................. 367/79 |
| 4,703,287 | A | | 10/1987 | Fournier, Jr. et al. |
| 4,821,035 | A | | 4/1989 | Hanson et al. |
| 4,845,494 | A | | 7/1989 | Hanson et al. |
| 4,849,753 | A | | 7/1989 | Merry |
| 5,130,706 | A | | 7/1992 | Van Steenwyk |
| 5,173,899 | A | * | 12/1992 | Ballance ..................... 370/503 |
| 5,231,611 | A | | 7/1993 | Laznicka, Jr. |
| 5,253,219 | A | | 10/1993 | Houston et al. |
| 5,253,271 | A | | 10/1993 | Montgomery |
| 5,331,318 | A | | 7/1994 | Montgomery |
| 5,579,842 | A | * | 12/1996 | Riley .................... 166/250.01 |
| 5,757,487 | A | | 5/1998 | Kersey |
| 5,808,779 | A | | 9/1998 | Weis |

(Continued)

FOREIGN PATENT DOCUMENTS

EP 0859472 8/1998

(Continued)

OTHER PUBLICATIONS

1999 IEEE International Solid-State Circuits Conference Digest of Technical Papers, 1st ed., pp. 248-249.

*Primary Examiner*—Albert K. Wong
(74) *Attorney, Agent, or Firm*—Konneker & Smith, P.C.

(57) ABSTRACT

A system and method are disclosed that provide for transmitting data from a downhole location to the surface. In one embodiment, a communications medium provides data transfer capabilities to the surface. A first downhole instrument is associated with the communications medium in order to measure a first downhole parameter and transmit first data relative to the first downhole parameter to the surface via the communications medium at a first time. A second downhole instrument is associated with the communications medium in order to measure a second downhole parameter and transmit second data relative to the second downhole parameter to the surface via the communications medium at a second time such that the first data is interleaved with the second data.

45 Claims, 5 Drawing Sheets

U.S. PATENT DOCUMENTS

| | | | |
|---|---|---|---|
| 5,838,727 A | 11/1998 | Lyon et al. | |
| 5,883,516 A | 3/1999 | Van Steenwyk et al. | |
| 5,898,517 A | 4/1999 | Weis | |
| 5,905,721 A | 5/1999 | Liu et al. | |
| 5,933,454 A | 8/1999 | Cioffi | |
| 5,986,749 A | 11/1999 | Wu et al. | |
| 5,987,197 A | 11/1999 | Kersey | |
| 6,020,830 A * | 2/2000 | Gannon et al. | 340/870.13 |
| 6,046,685 A | 4/2000 | Tubel | |
| 6,072,567 A | 6/2000 | Sapack | |
| 6,144,859 A | 11/2000 | LaDue et al. | |
| 6,184,798 B1 | 2/2001 | Egri | |
| 6,188,223 B1 | 2/2001 | Van Steenwyk et al. | |
| 6,252,656 B1 | 6/2001 | Wu et al. | |
| 6,269,198 B1 | 7/2001 | Hodgson et al. | |
| 6,271,766 B1 | 8/2001 | Didden et al. | |
| 6,282,334 B1 | 8/2001 | Hodgson et al. | |
| 6,285,806 B1 | 9/2001 | Kersey et al. | |
| 6,317,029 B1 | 11/2001 | Fleeter | |
| 6,374,913 B1 | 4/2002 | Robbins et al. | |
| 6,469,635 B1 | 10/2002 | Hudson | |
| 6,496,705 B1 | 12/2002 | Ng et al. | |
| 6,886,631 B2 * | 5/2005 | Wilson et al. | 166/250.07 |
| 2002/0140572 A1 | 10/2002 | Gardner et al. | |
| 2003/0006906 A1 | 1/2003 | Gardner et al. | |

FOREIGN PATENT DOCUMENTS

| | | |
|---|---|---|
| WO | WO 98/52312 | 11/1998 |
| WO | WO 99/33215 | 7/1999 |
| WO | WO 00/29717 | 5/2000 |
| WO | WO 01/08326 | 2/2001 |
| WO | WO 01/49001 | 7/2001 |
| WO | WO 02/077413 | 10/2002 |

* cited by examiner

SYSTEM AND METHOD FOR TRANSMITTING DOWNHOLE DATA TO THE SURFACE

BACKGROUND

This invention relates, in general, to data transmissions and, in particular, to a system and method for transmitting data to the surface relative to a downhole parameter, such as pressure, temperature, density or position, measured by an instrument positioned downhole.

Well completion and well production require a great quantity of information relating to downhole parameters that characterize various physical quantities. During well completion, as the well is brought to productive status, well logging is utilized as a technique for providing information regarding downhole parameters of the particular earth formation being drilled. Such information typically includes characteristics of the formations traversed by the wellbore, in addition to data relating to the size and configuration of the borehole itself. The collection of downhole parameters during well completion, which is commonly referred to as logging, may be performed by several methods including wireline logging wherein one or more probes having sensors are lowered into the wellbore after some or all of the well has been drilled.

During production as formation fluids are brought to the surface, various downhole parameters are measured and recorded. For example, in order to selectively permit and prevent fluid flow into the production tubing string, it is common practice to install one or more sliding sleeve type flow control devices within the tubing string. A sensor is often positioned proximate to the sleeve to monitor the position of the sleeve. By way of another example, during production, sensors are often positioned within the production intervals of the wellbore to monitor attributes, such as pressure, temperature and density of the formation fluids.

Whether the downhole parameters are measured and recorded during completion or production, the measurements may be processed by a computer and stored in computer memory or other media. The processed measurements may be utilized to create a chart or plot which a formation evaluation professional or driller analyzes in order to gain insight into the well. In general, the evaluation of a formation may be improved by increasing the number of downhole measurements. Balancing the logistical and economical constraints of formation evaluation with the need to increase the amount of formation parameters collected has lead to the utilization of frequency-division multiplexing or FDM which assigns a different frequency band to each sensor so that multiple sensors can share a common communications medium. FDM increases the number of measurements which can be made downhole while minimizing the infrastructure required to transmit these measurements.

FDM is not without limitations, however. Equipment utilizing FDM requires particular downhole and surface components. For example, tone decoders and tuning components are required to properly alter the frequency of the signals and to decode the data carried therein. Additionally, equipment utilizing FDM requires an initial frequency calibration, which has proved to be costly.

Accordingly, a need exists for a system and method for transmitting downhole data to the surface. Further, a need exists for such a system and method to employ a minimum number of components. Moreover, a need exists for such a system and method that are able to carry the signals of multiple sensors over a minimum number of communication medium.

SUMMARY

The present invention disclosed herein provides a system and method for transmitting downhole data to the surface. In particular, the system and method of the present invention employ a minimum number of components while being able to transmit signals of multiple instruments over a single communication medium. The present invention accomplishes these advantages by employing time division multiplexing (TDM) and substantially simultaneously initializing the instruments in order to provide a common reference for specifying the time frames and time slots associated with TDM.

In one aspect, the present invention is directed to a system for transmitting downhole data to the surface via a communications medium that provides data transfer capabilities to the surface. A first downhole instrument is operably associated with the communications medium. The first downhole instrument measures a first downhole parameter and transmits first data relative to the first downhole parameter to the surface via the communications medium at a first time. A second downhole instrument is also operably associated with the communications medium. The second downhole instrument measures a second downhole parameter and transmits second data relative to the second downhole parameter to the surface via the communications medium at a second time such that the first data is interleaved with the second data.

In one embodiment, the first and second downhole instruments are substantially simultaneously initialized such that a common reference is defined for specification of the first and second times. The substantially simultaneously initialization may occur by providing power to the first and second instruments, alternating the voltage provided to the first and second instruments or the like. Frequency shift keying may be employed to transmit downhole data. The communications medium may be an instrument wire, a coaxial cable or a twisted pair cable, for example. The first and second downhole instruments may measure any designated downhole parameter including, but not limited to, temperature, position, pressure, differential pressure and density. The first downhole parameter and the second downhole parameter may be identical parameters or different parameters. The first downhole instrument may periodically measure the first downhole parameter and transmit first data relative to the first downhole parameter. Similarly, the second downhole instrument may periodically measure the second downhole parameter and transmit second data relative to the second downhole parameter. The first and the second downhole instruments may comprise quartz downhole gauges.

In another aspect, the present invention is directed to a system for transmitting downhole data to the surface. A communications medium provides data transfer to the surface. A first downhole instrument is operable to measure a first downhole parameter and a second downhole instrument is operable to measure a second downhole parameter. A first time slot in a first time frame is associated with the communications medium during which first downhole data relative to the first downhole parameter is transmitted to the surface. Additionally, a second time slot in the first time frame is associated with the communications medium during which second downhole data relative to the second downhole parameter is transmitted to the surface.

In one embodiment, the system also includes a second frame having a third time slot operable to transmit first downhole data. In particular, the transmission of the first downhole data may be in response to an event, such as a temperature change, a position change, a pressure change, a differential pressure change or a density change, for example, related to the first downhole parameter. Additionally, in response to a timing error, the first and second instruments may be reinitialized in order to correct the timing error. The timing error may consist of the first time slot leading, the first time slot lagging, the second time slot leading or the second time slot lagging, for example. The power provided the first and the second downhole instruments may be cycled OFF and ON in order to reinitiate the instruments. Alternatively, the voltage provided to the first and second instruments may be alternated to reinitiate the instruments.

In a further aspect, the present invention is directed to a method for transmitting downhole data to the surface. The method includes substantially simultaneously initializing the first and second downhole instruments for data transmission, measuring a first downhole parameter with the first downhole instrument, measuring a second downhole parameter with the second downhole instrument, transmitting first data relative to the first downhole parameter at a first time from the first downhole instrument to the surface via a communications medium and transmitting second data relative to the second downhole parameter at a second time from the second downhole instrument to the surface via the communications medium such that the first data is interleaved with the second data.

In a further aspect, the present invention is directed to another method for transmitting downhole data to the surface. The method includes measuring a first downhole parameter at a first downhole instrument, measuring a second downhole parameter at a second downhole instrument, sending first data relative to the first downhole parameter via a first time slot of a first frame for communication to the surface and sending second data relative to the second downhole parameter via a second time slot of the first frame for communication to the surface.

These and other features, advantages, benefits and objects of the present invention will become apparent to one of ordinary skill in the art upon careful consideration of the detailed description of representative embodiments of the invention hereinbelow and the accompanying drawings.

BRIEF DESCRIPTION OF THE DRAWINGS

For a more complete understanding of the features and advantages of the present invention, reference is now made to the detailed description of embodiments of the invention along with the accompanying figures in which corresponding numerals in the different figures refer to corresponding parts and in which.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use certain examples of the invention, and do not delimit the scope of the present invention. In the following description, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

Figure 1:
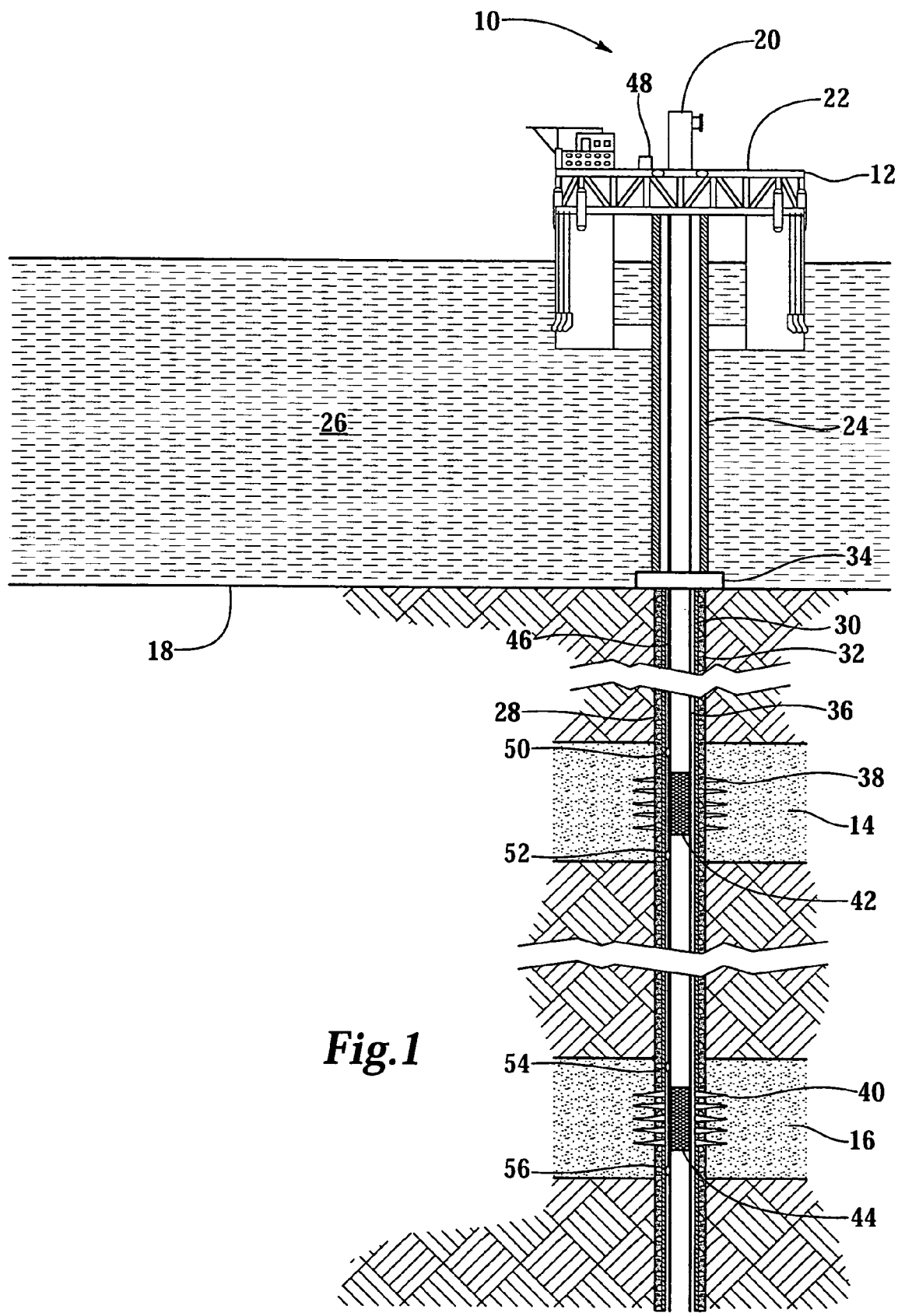
FIG. 1 is a schematic illustration of an offshore oil and gas platform operating downhole instruments for transmitting downhole data to the surface according to the present invention.

Referring initially to FIG. 1, an offshore oil and gas platform operating downhole instruments for transmitting downhole data to the surface according to the present invention is schematically illustrated and generally designated 10. A semi-submersible platform 12 is centered over submerged oil and gas formations 14 and 16 located below sea floor 18. Wellhead 20 is located on deck 22 of platform 12. Well 24 extends through the sea 26 and penetrates the various earth strata including formations 14, 16 to form wellbore 28. A casing 30 is cemented within wellbore 28 by cement 32. Disposed within casing 30 and extending from wellhead 20 through a subsea installation 34 and formations 14, 16 is production tubing 36. Casing 30 and cement 32 are perforated by perforations 38, 40 at formations 14, 16, respectively, to provide fluid communication from formations 14, 16 into the interior of wellbore 28. Sand control screen assemblies 42, 44 are positioned within production tubing 36 and adjacent to formations 14, 16, respectively, in order to filter particle matter of a predetermined size and allow fluid communication into production tubing 36.

A communications medium 46 runs from wellhead 20 through the annulus created between casing 30 and production tubing 36. Downhole instruments are operably associated with communications medium 46 in order to measure downhole parameters and transmit data relative to the downhole parameters to a surface control unit 48 for further processing and analysis. In particular, instrument 50 is positioned adjacent formation 14 and proximate to the uphole end of sand control screen assembly 42. Similarly, instrument 52 is positioned adjacent formation 14 and proximate to the downhole end of sand control screen assembly 42 and downhole instruments 54 and 56 are positioned adjacent formation 16 and proximate to the uphole and downhole ends, respectively, of sand control screen assembly 44. Each instrument 50, 52, 54, 56 may measure a downhole parameter of the fluid, such as temperature, pressure, differential pressure or density, for example. Alternatively, one or more of downhole instruments 50, 52, 54, 56 may measure an operating position of a downhole tool. For example, downhole instrument 50 may measure, i.e., sense, the position or degree of openness of a sliding sleeve operably associated with formation 14. Each instrument 50, 52, 54, 56 transmits data relative to the measured downhole parameter to the surface via communications medium 46. As will be explained in detail hereinbelow, downhole instruments 50, 52, 54, 56 employ time division multiplexing or TDM in order to transmit multiple signals over the single communications medium 46. In particular, data is collected from multiple locations and sent to the surface via a single communications medium. Data integrity is maintained by assigning each of the downhole instruments a time slot in which to send data. In one embodiment, each of downhole instruments 50, 52, 54, 56 is substantially simultaneously initialized with a power ON signal transmitted from surface control unit 48. Downhole instruments 50, 52, 54, 56 utilize the substantially simultaneous initialization as a common reference or epoch for time slot specification. Accordingly, the TDM employed with the common referencing scheme of the present invention minimizes the number of components present in an instrument by eliminating the FDM transmission schemes and the associated bidirectional command and response methodologies as well as the tone decoders and tuning components. It should be appreciated that although the present invention is depicted being utilized in a production environment, the teachings of the present invention may be employed during other periods during the life cycle of the well including drilling or completion. As previously discussed, the processed measurements may be utilized to create a chart or other report which a formation evaluation professional analyzes in order to gain insight into the well.

Figure 2:
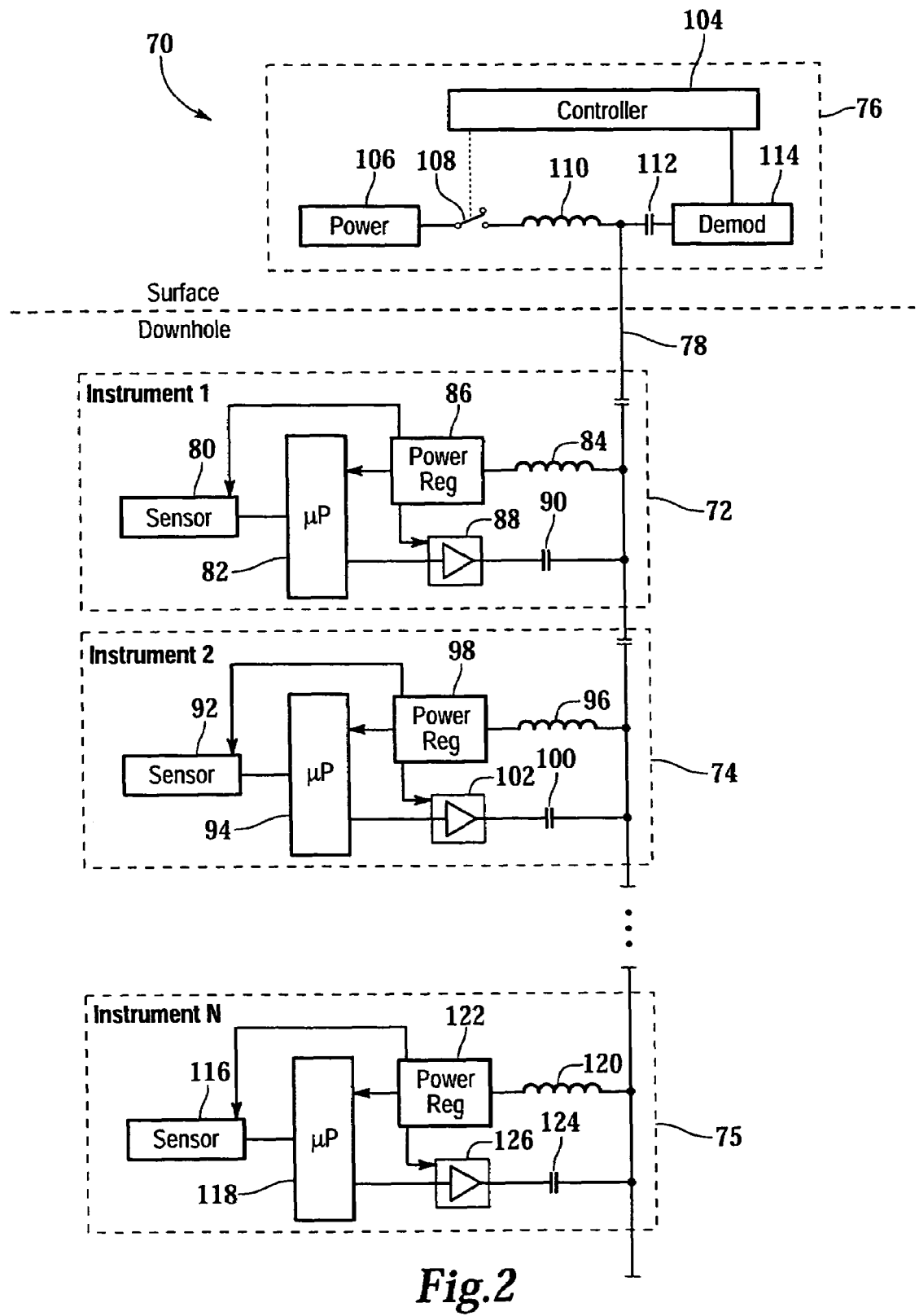
FIG. 2 is a schematic illustration of a system for transmitting downhole data to the surface according to the teachings of the present invention.

FIG. 2 depicts a system 70 for transmitting downhole data to the surface according to the teachings of the present invention. System 70 may include any number of instruments, such as quartz downhole gauges, positioned at any number of downhole locations. For purposes of illustration, three downhole instruments 72, 74, 75 are depicted and labeled Instrument 1, Instrument 2 and Instrument N, respectively. Downhole instruments 72, 74, 75 transmit data to a surface control unit 76 via communications medium 78, which may be an instrument wire, a coaxial cable or a twisted pair cable, for example. Regardless of the electromagnetic carrier selected for communications medium 78, preferably, communications medium 78 is hermetically sealed to withstand the temperatures and pressures experienced in a downhole environment.

Instrument 72 includes a sensor 80 which is the piece of instrument 72 that is responsive to the absolute value or change in a physical quantity, such as temperature, pressure, flow rate, position, pH, light, sound or the like. Sensor 80 converts the absolute value or change in the physical quantity into an input signal which is supplied to a microprocessor 82 that performs arithmetic, logic and control operations with the assistance of internal memory. Additional inputs to microprocessor 82 include an inductor 84 and a power regulator 86 that are coupled in series to communications medium 78 and microprocessor 82. Inductor 84 serves as a blocking filter for communication signals and power regulator 86 controls the amount of power delivered to the electronics, e.g., sensor 80, microprocessor 82 and a transmitter 88, in instrument 72. Microprocessor 82 drives the processed input signal received from sensor 80 to transmitter 88 positioned in series with a coupling capacitor 90. Transmitter 88 modulates the signal received from microprocessor 82 for transmission as a portion of a TDM frame to surface control unit 76 via communications medium 78.

Instrument 74 comprises similar electronics to instrument 72 including a sensor 92, a microprocessor 94, an inductor 96, a power regulator 98, a capacitor 100 and a transmitter 102. Likewise, instrument 75 comprises similar electronics to instrument 72 including a sensor 116, a microprocessor 118, an inductor 120, a power regulator 122, a capacitor 124 and a transmitter 126. Surface control unit 76 includes a controller 104 which initiates various management tasks associated with system 70. For example, surface control unit 76 monitors and records the signals received from downhole instruments 72, 74, 75 and controls the initialization of downhole instruments 72, 74, 75. Controller 104 controls the power from a power source 106 to downhole instruments 72, 74, 75 with a switch 108 that, when closed, places power source 106 in electrical communication with communications medium 78 via an inductor 110. A capacitor 112 and a demodulator 114 are connected with controller 104 to receive the TDM frame from downhole instruments 72, 74, 75. In particular, demodulator 114 receives the TDM frame from the communications medium 78 and demodulates the respective signals of downhole instruments 72, 74, 75 from the TDM frame.

In operation, controller 104 actuates switch 108 and closes the circuit between power source 106 and downhole instruments 72, 74, 75 in order to activate downhole instruments 72, 74, 75. With reference to instrument 72, power regulator 86 receives power and, upon the power level stabilizing, actuates microprocessor 82, sensor 80 and transmitter 88. Similarly, with reference to instrument 74, the power supplied by power source 106 activates microprocessor 94, sensor 92 and transmitter 102 via power register 98 once the power supply has stabilized. Likewise, with reference to instrument 75, the power supplied by power source 106 activates microprocessor 118, sensor 116 and transmitter 126 via power register 122. Once activated, sensors 80, 92, 116 measure downhole parameters and supply input signals to microprocessors 82, 94, 118, respectively. The signals are then processed and forwarded to transmitters 88, 102, 126 wherein the signals are formatted and modulated for transmission. The modulation process changes one or more of the fundamental characteristics of the signal to encode information therein. Preferably, downhole instruments 72, 74, 75 utilize frequency modulation which is commonly referred to as frequency shift keying. In the frequency shift keying, a tone is designated for 0 and a tone is designated for 1. Typically, changing the signal to a higher frequency from a base frequency encodes a bit value of 1 and no change to the base frequency of the signal indicates a value of 0. In one embodiment, 48 kHz is designated 1 and 38.4 kHz is designated 0. It should be appreciated, however, that other modulation techniques, such as amplitude modulation and phase modulation, for example, may be employed with the present invention.

Once downhole instruments 72, 74, 75 have formatted the respective signals for transmission, each instrument waits for its respective time slot to modulate and send the transmission. For example, instrument 72 may be assigned a first time slot, instrument 74 may be assigned a second time slot and instrument 75 may be assigned an Nth time slot. At the first time slot, instrument 72 sends its modulated signal, at the second time slot instrument 74 sends its modulated signal and at the Nth time slot instrument 75 sends its modulated signal. The modulated signals are received by demodulator 114 of surface control unit 76, demodulated and forwarded to controller 104 for further processing. In particular, the present invention conserves power by permitting the instruments to be powered down after the measurements have been made and transmitted to the surface. When it is desirable to obtain additional data from instruments 72, 74, 75 the process is repeated by repowering up instruments 72, 74, 75. Alternatively, instrument 72 may be assigned a reoccurring first time slot within each frame of an ongoing TDM communication protocol. Likewise, instrument 74 may be assigned a reoccurring second time slot and instrument 75 may be assigned a reoccurring Nth time slot.

It should be appreciated that although particular circuitry has been described in association with downhole instruments 72, 74, 75 and surface control unit 76, other electrical components and arrangements are within the teachings of the present invention. As described, the instruments and surface control unit of the present invention have a minimum number of components and share a single communications medium. It should be appreciated, however, that redundant electrical components or a redundant communications medium may be employed to increase the robustness of the system.

Figure 3:
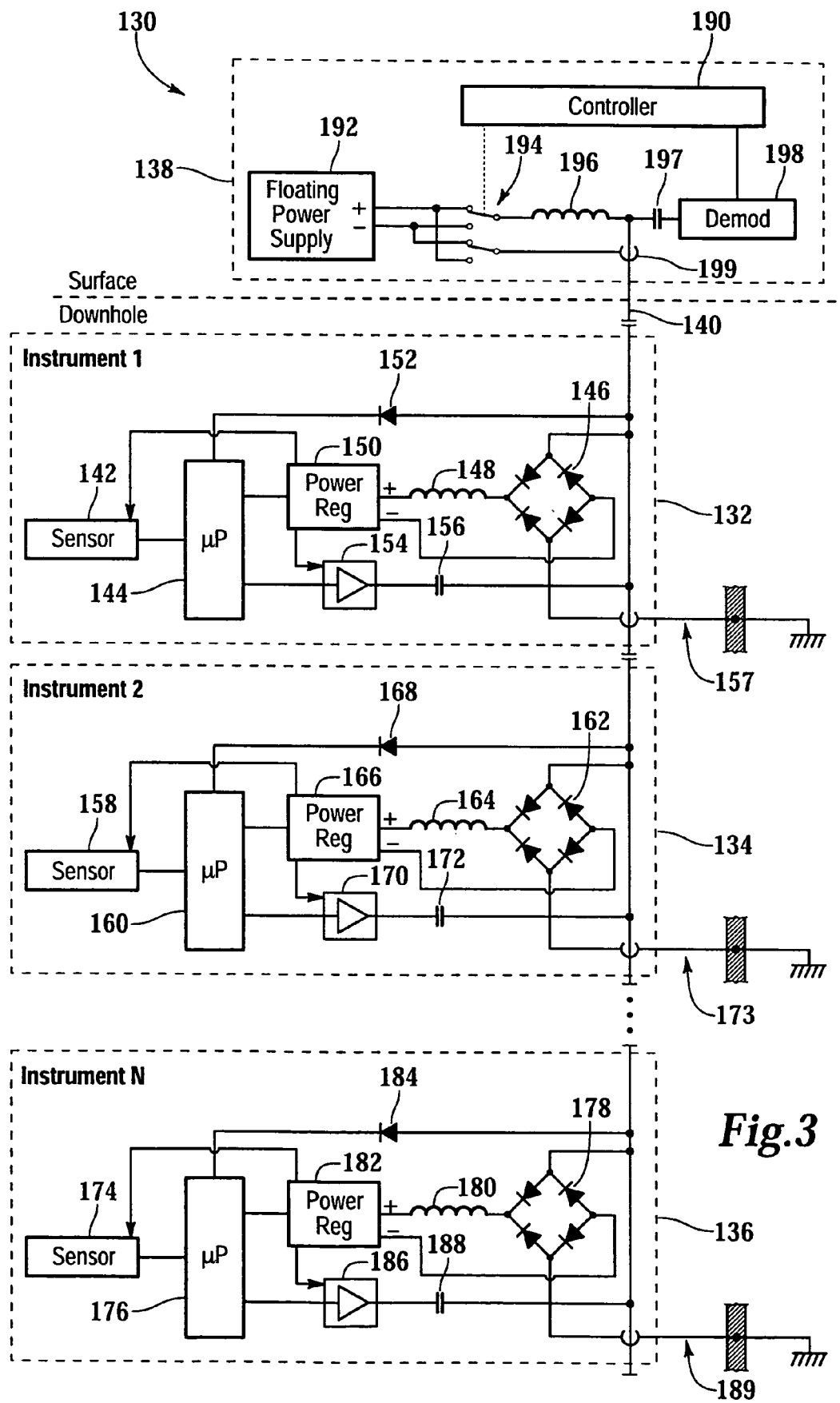
FIG. 3 is a schematic illustration of an alternate embodiment of a system for transmitting downhole data to the surface according to the teachings of the present invention.

With reference to FIG. 3, therein is depicted an alternate embodiment of a system 130 for transmitting downhole data to the surface according to the teachings of the present invention. System 130 includes instruments 132, 134, 136 which are labeled Instrument 1, Instrument 2 and Instrument N, respectively. It should be appreciated, however, that any number of instruments may be employed with system 130. A surface control unit 138 is positioned at the surface and a communications medium 140 provides for the transmission of power and data between surface control unit 138 and instruments 132, 134, 136.

Similar to instrument 72 of FIG. 2, downhole instrument 132 includes a sensor 142 for measuring a downhole parameter and a microprocessor 144. Downhole instrument 132 is coupled to communications medium 140 in order to receive power signals from the surface and transmit data relative to the measured downhole parameter. With respect to the power receiving functionality of the downhole instrument 132, a rectifier 146 is connected in series with communications medium 140. An inductor 148 and a power regulator 150 are connected in series from rectifier 146 to microprocessor 144. A diode 152 is connected in parallel to rectifier 146 and inductor 148 and power regulator 150. The electrical configuration provided by rectifier 146 and diode 152 permits instrument 132 to be initialized or, as will be discussed in more detail hereinbelow, reinitialized, by a change in the voltage supplied to instrument 132. In particular, the common reference for specifying the time slot may be reinitiated by performing a polarity reversal, i.e., alternating the voltage supplied to instrument 132 from negative to positive or positive to negative. It should be appreciated that sufficient holdup capacitance in regulator 150 is provided such that power provided at the output of regulator 150 is uninterrupted. The data transmission capabilities of downhole instrument 132 are similar to instrument 72 of FIG. 2 and include a transmitter 154 and a capacitor 156 that are positioned in series between microprocessor 144 and communications medium 140 in order to transmit data relative to the measurements by sensor 142 of the downhole parameters. In order to improve signal integrity, a shield and armor, which are collectively designated 157, are in contact with the tubing.

Instruments 134, 136 have similar electrical components to instrument 132. In particular, instrument 134 includes a sensor 158 and a microprocessor 160. For receiving a power signal from power source 192, instrument 134 includes a rectifier 162, an inductor 164, a power regulator 166 and a diode 168. For transmitting downhole data to surface control unit 138, instrument 134 includes a transmitter 170 and a capacitor 172. Further, a shield and armor 173 are provided to improve the signal transmission. Similarly, instrument 136 includes a sensor 174, a microprocessor 176, a rectifier 178, an inductor 180, a power register 182, a detector 184, a transmitter 186, a capacitor 188 and a shield and armor 189.

Surface control unit 138 includes a controller 190 that in conjunction with a switch 194, controls the voltage provided by a floating power supply 192 to instruments 132, 134, 136 via an inductor 196 and communications medium 140. A capacitor 197 and a demodulator 198 are connected with controller 190 in order to receive the TDM frame from downhole instruments 132, 134, 136. A shield 199 provides further signal integrity. In operation, controller 190 alternates the voltage supplied to instruments 132, 134, 136 from positive to negative or from negative to positive. The substantially simultaneous change in voltage supplied to instruments 132, 134, 136 initializes, or reinitializes, instruments 132, 134, 136 such that a common reference is defined for the specification of the first time frame or epoch relative to the transmission of one or more TDM frames from instruments 132, 134, 136 to surface control unit 138. Once initialized or reinitialized, as the case may be, each of instruments 132, 134, 136 measures a downhole parameter and transmits data relative to its respective downhole parameter at its respective time slot in the TDM frame.

Figure 4:
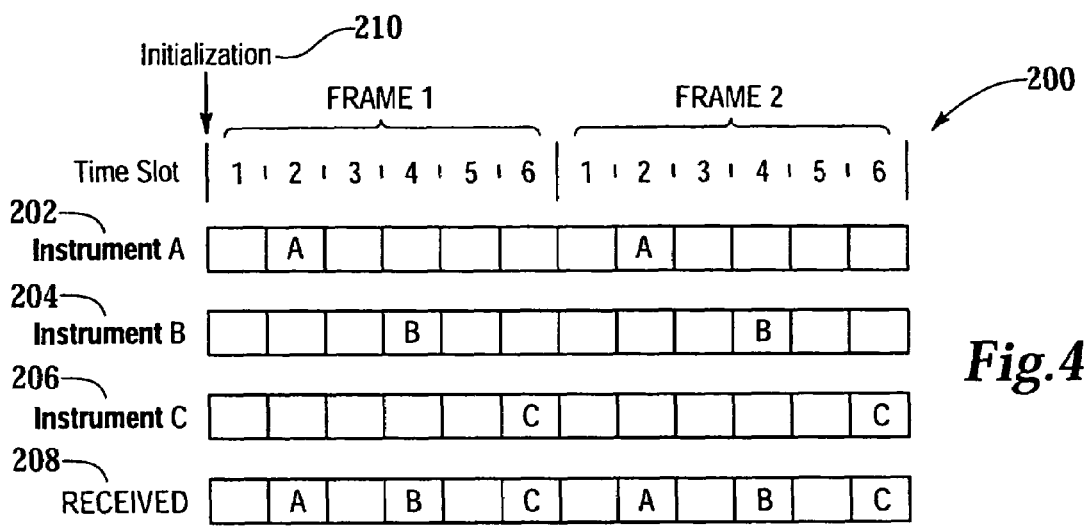
FIG. 4 is a timing diagram illustrating downhole instruments transmitting data to the surface in accordance with the teachings of the present invention.

FIG. 4 depicts a timing diagram illustrating downhole instruments transmitting data in accordance with the teachings of the present invention. As illustrated, timing sequence 200 exemplifies an embodiment of instruments 202, 204, 206 that transmit data A, B and C, respectively. A surface control unit 208 receives multiplexed data from downhole instruments 202, 204, 206. Within each timing frame, i.e., frame 1 and frame 2, six time slots are present. Each time slot may be of any duration and each time slot is not required to have the same duration. Moreover, any number of time slots may be employed in a particular frame. Instrument 202 transmits data A relative to a measured downhole parameter at its assigned time slot, i.e., time slot 2. Similarly, instrument 204 transmits data B relative to a measured downhole parameter at its assigned time slot, i.e., time slot 4, and instrument 206 transmits data C relative to a measured downhole parameter at its assigned time slot, i.e., time slot 6. Downhole instruments 202, 204, 206 are substantially simultaneously initialized at initialization 210 by a power ON signal, for example. Initialization 210 defines a common reference to downhole instruments 202, 204, 206 for specifying the start of frame 1. At the start of frame 1, time slot 1 comprises a guardband that defines a time slot adjacent to a time slot containing a data transmission in order to reduce interference. Although guardbands, which comprise time slots of inactivity, are not required for the practice of the present invention, guardbands are also positioned between time slots containing data transmissions in order to reduce interference. For example, guardbands are positioned at time slot 3 which is between data containing time slots 2 and 4. As illustrated, instrument 202 transmits data A at time slot 2 of frame 1, instrument 204 transmits data B at time slot 4 of frame 1 and instrument 206 transmits data C at time slot 6 of frame 1. Data transmissions A, B and C are interleaved and thereby multiplexed with respect to time and received by surface control unit 208 as XAXBXC, where X represents a guardband.

In some embodiments of the present invention, downhole data may be sent to the surface from each instrument on a reoccurring basis. For example, FIG. 4 illustrates two frames. Similar to frame 1, in frame 2, instrument 202 transmits data A at time slot 2, instrument 204 transmits data B at time slot 4 and instrument 206 transmits data C at time slot 6. Guardbands are positioned at time slots 1, 3 and 5 to prevent interference. Data transmissions A, B and C are thereby interleaved and received by surface control unit 208 as XAXBXC, where X represents a guardband. Following frame 2, instruments 202, 204, 206 may continue to send data in a manner similar to the manner described in relation to frames 1 and 2. It should be appreciated, however, that the power to instruments 202, 204, 206 may be turned OFF as soon as a sufficient amount of data has been collected. For example, instruments 202, 204, 206 may be turned OFF after frame 1, or alternatively, instruments 202, 204, 206 may be supplied power indefinitely in order to receive continuous data relative to downhole measurements. Accordingly, the present invention permits the instruments 202, 204, 206 to be operated for only as long as data collection is required.

Figure 5:
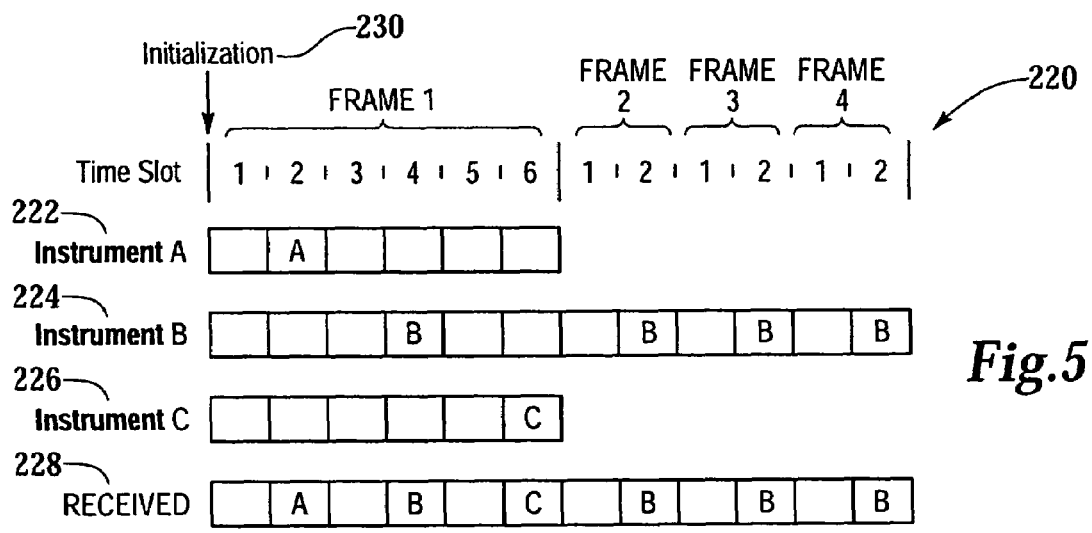
FIG. 5 is a timing diagram illustrating downhole instruments transmitting data to the surface in an alternate embodiment according to the teachings of the present invention.

FIG. 5 depicts a timing diagram illustrating downhole instruments transmitting data in an alternate embodiment according to the teachings of the present invention. Similar to timing sequence 200 of FIG. 4, timing sequence 220 exemplifies an embodiment of instruments 22, 224, 226 that transmit data A, B and C, respectively, at designated time slots of frame 1. A surface control unit 228 is operable to receive multiplexed data from downhole instruments 222, 224, 226. Following frame 1, downhole instruments 222 and 226 may be turned OFF or otherwise instructed not to transmit additional data. Thereafter, only downhole instrument 224 continues to periodically make downhole measurements and transmit data relative to the downhole measurements in frames 2, 3, 4 and continuing frames as required. As illustrated, each frame may comprise a reduced set of time slots, e.g., two time slots, since multiplexing is no longer required. Accordingly, it should be appreciated that the present invention provides a variety of flexible data collection schemes that serve to optimize power and bandwidth usage of the system. It should be appreciated that this process of a single instrument continuing to make downhole measurements and transmitting data may continue for as many frames as desired.

In another embodiment, frame 2 provides time slots operable to transmit downhole data in response to an event related to a downhole parameter. For example, instrument 224 may transmit data B upon detecting a temperature change, position change, pressure change, differential pressure change or density change, for example. In this particular embodiment, instrument 224 may transmit data B upon detecting the event.

Figure 6:
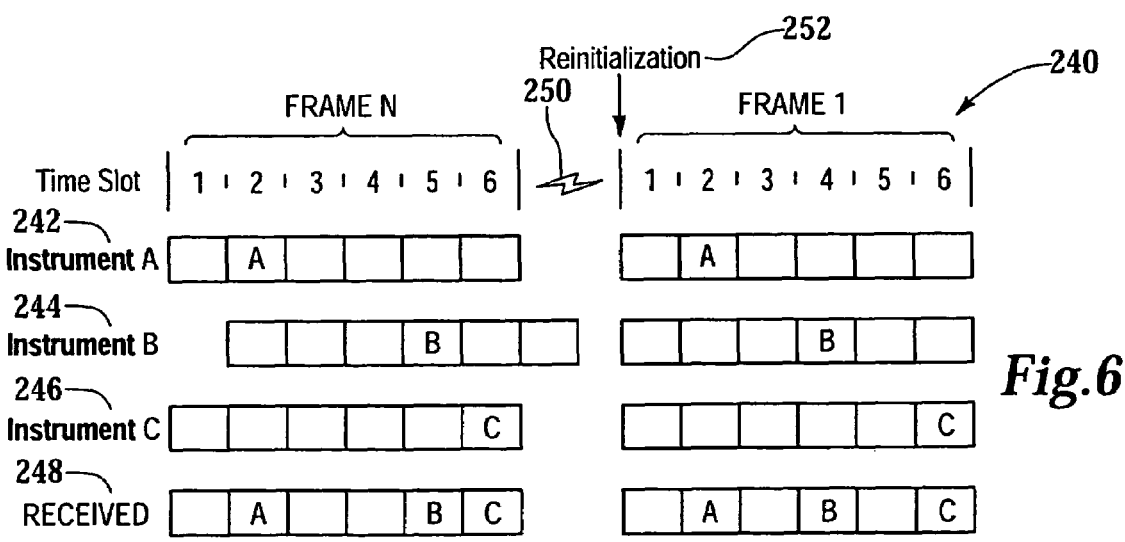
FIG. 6 is a timing diagram illustrating downhole instruments transmitting data to the surface in a further embodiment according to the teachings of the present invention.

FIG. 6 depicts a timing diagram illustrating downhole instruments transmitting data in a further embodiment according to the teachings of the present invention. Similar to timing sequence 200 of FIG. 4, timing sequence 240 exemplifies an embodiment of instruments 242, 244, 246 that transmit data A, B and C, respectively, at designated time slots of frame N. A surface control unit 248 receives multiplexed data from downhole instruments 242, 244, 246. In the illustrated embodiment, instrument 242 is assigned time slot 2, instrument 244 is assigned time slot 4 and instrument 246 is assigned time slot 6. The data transmissions from instrument 244, however, are experiencing a timing error, i.e., the data transmissions are lagging by one time slot and data B is being transmitted at time slot 5 as opposed to time slot 4. As depicted, the data received by surface control unit 248 is XAXXBC where X is a guardband. The data B received from instrument 244 and the data C being received from instrument 246 are close to overlapping and interfering with one another. In particular, the guardband which isolates data B from data C is not present to minimize interference. In response to this potential interference, the power to downhole instruments 242, 244, 246 is cycled OFF and ON as depicted by power cycle indicia 250. The cycling of the power OFF and ON substantially simultaneously initializes downhole instruments 242, 244, 246 as indicated by reinitialization 252, which redefines the common reference for the specification of the next time frame, i.e., frame 1. Alternatively, it should be appreciated that reinitialization may be achieved by performing the aforementioned polarity reversal. As depicted in frame 1, reinitialization 252 corrects the lag of instrument 244 so that instrument 242 transmits data A in time slot 2, instrument 244 transmits data B in time slot 4 and instrument 246 transmits data C in time slot 6. Further, reinitialization 252 restores the guardbands. It should be appreciated that although a lagging timing error is depicted in FIG. 6, the timing error may also be of a leading nature. For example, if instrument 244 had transmitted data B at time slot 3, instrument 244 would have been experiencing a timing error of a leading nature.

Figure 7:
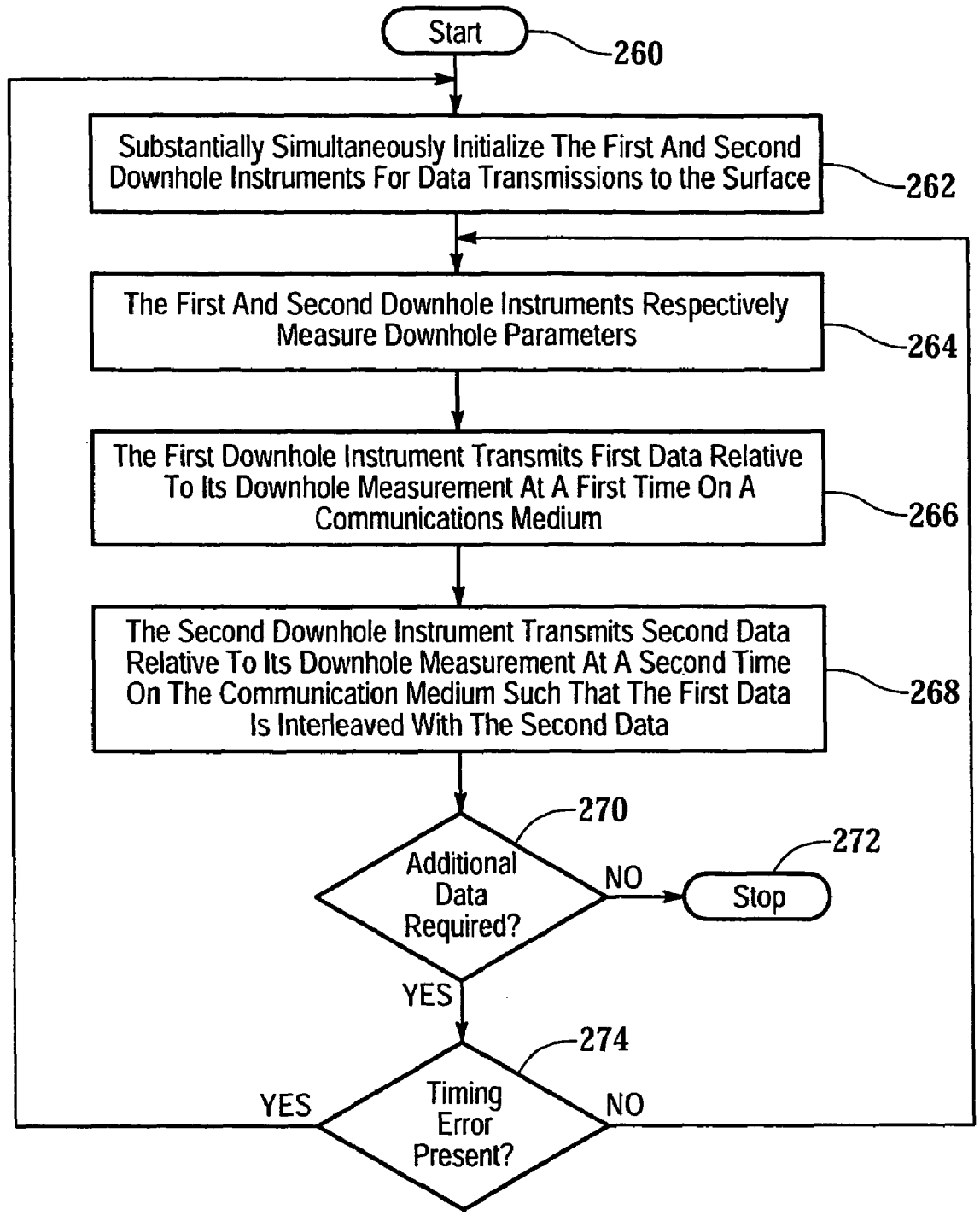
FIG. 7 is a flow chart illustrating a method for transmitting downhole data to the surface.

FIG. 7 depicts a flow chart illustrating a method for transmitting downhole data to the surface. At block 260, the method starts. At block 262, the first and second downhole instruments are substantially simultaneously initialized for data transmissions to the surface. The substantially simultaneous initialization may be provided by power being substantially simultaneously provided to first and second downhole instruments. In particular, the substantially simultaneous initialization provides a common reference for specifying time. At block 264, the first and second downhole instruments respectively measure downhole parameters such as the aforementioned temperature, pressure, differential pressure, density, operating position of a tool or the like. At block 266, the first downhole instrument transmits first data relative to its downhole measurement at a first time on a communications medium which the first downhole instrument and the second downhole instrument share. At block 268, the second downhole instrument transmits second data relative to its downhole measurement at a second time on the communications medium such that the first data is interleaved with the second data. By interleaving the first and second data with respect to time, the data is multiplexed and one communications medium is leveraged and utilized for multiple downhole instruments. At decision block 270, if additional data is not required, then the method advances to block 272 where the method is complete and the system may be powered down.

If, however, additional data is required, then the method advances to decision block 274, wherein if a timing error, e.g., lagging or leading in a portion of the data, is detected, then the method returns to block 262 so that the downhole instruments may be reinitialized and the timing error corrected. On the other hand, if no timing error is detected, then the method returns to block 264 so that further downhole measurements may be performed. As previously discussed, the present invention optimizes power consumption by permitting data to be collected as required.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A system for transmitting downhole data to the surface comprising:
   a communications medium operable to provide data transfer to the surface;
   a first downhole instrument operably associated with the communications medium, the first downhole instrument being operable to measure a first downhole parameter and transmit first data relative to the first downhole parameter to the surface via the communications medium; and
   a second downhole instrument operably associated with the communications medium and spaced apart from the first downhole instrument, the second downhole instrument being operable to measure a second downhole parameter and transmit second data relative to the second downhole parameter to the surface via the communications medium,
   wherein a first transmitter of the first downhole instrument transmits the first data at a first time, and a second transmitter of the second downhole instrument transmits the second data at a second time such that the first data is interleaved with the second data.

2. The system of claim 1 wherein transmission capabilities of the first and second downhole instruments are substantially simultaneously initialized such that a common reference is defined for specification of the first and second times.

3. The system of claim 2 wherein the transmission capabilities are substantially simultaneously initialized by providing power to the first and second downhole instruments.

4. The system of claim 2 wherein the transmission capabilities are substantially simultaneously initialized by alternating voltage.

5. The system of claim 2 wherein the first and second downhole instruments employ frequency shift keying to transmit the first and second data.

6. The system of claim 2 wherein the communications medium is selected from a group consisting of an instrument wire, a coaxial cable and a twisted pair cable.

7. The system of claim 2 wherein the first and second downhole parameters are at least one of temperature, position, pressure, differential pressure and density.

8. The system of claim 2 wherein the first downhole parameter and the second downhole parameter are identical parameters.

9. The system of claim 2 wherein the first downhole parameter and the second downhole parameter are different parameters.

10. The system of claim 2 wherein the first downhole instrument periodically measures the first downhole parameter and transmits the first data relative to the first downhole parameter.

11. The system of claim 2 wherein the second downhole instrument periodically measures the second downhole parameter and transmits the second data relative to the second downhole parameter.

12. The system of claim 2 wherein the first and the second downhole instruments further comprise quartz downhole gauges.

13. A system for transmitting downhole data to the surface comprising:
    a communications medium operable to provide data transfer to the surface;
    a first downhole instrument operable to measure a first downhole parameter;
    a second downhole instrument operable to measure a second downhole parameter, the second downhole instrument being spaced apart from the first downhole instrument; and
    a first frame associated with the communications medium, the first frame having a first time slot for transmitting first downhole data relative to the first downhole parameter to the surface and a second time slot for transmitting second downhole data relative to the second downhole parameter to the surface,
    wherein a first transmitter of the first instrument transmits the first data in the first time slot, and a second transmitter of the second instrument transmits the second data in the second time slot, such that the first and second data are interleaved.

14. The system of claim 13 wherein transmission capabilities of the first and second downhole instruments are substantially simultaneously initialized such that a common reference is defined for specification of the first frame.

15. The system of claim 14 wherein the transmission capabilities are substantially simultaneously initialized by providing power to the first and second downhole instruments.

16. The system of claim 13 further comprising a second frame associated with the communications medium, the second frame having a third time slot for transmitting the first downhole data.

17. The system of claim 13 further comprising a second frame associated with the communications medium, the second frame having a third time slot for transmitting the first downhole data in response to an event related to the first downhole parameter.

18. The system of claim 17 wherein the event is selected from a group of events consisting of temperature change, position change, pressure change, differential pressure change and density change.

19. The system of claim 13 wherein, responsive to a timing error, the first and second downhole instruments are reinitialized in order to correct the timing error.

20. The system of claim 19 wherein the timing error is selected from a group consisting of the first time slot leading, the first time slot lagging, the second time slot leading and the second time slot lagging.

21. The system of claim 19 wherein reinitializing the first and second downhole instruments further comprises cycling power OFF and ON to the first and second downhole instruments.

22. The system of claim 19 wherein reinitializing the first and second downhole instruments further comprises alternating power to the first and second downhole instruments.

23. The system of claim 13 wherein the first and second downhole instruments employ frequency key shifting to transmit the first and second downhole data.

24. The system of claim 13 wherein the communications medium is selected from a group consisting of an instrument wire, a coaxial cable and a twisted pair cable.

25. The system of claim 13 wherein the first and second downhole parameters are selected from a group consisting of temperature, position, pressure, differential pressure and density.

26. The system of claim 13 wherein the first downhole parameter and the second downhole parameter are identical parameters.

27. The system of claim 13 wherein the first downhole parameter and the second downhole parameter are different parameters.

28. The system of claim 13 wherein the first and the second downhole instruments further comprise quartz downhole gauges.

29. A method for transmitting downhole data to the surface comprising the steps of:
 substantially simultaneously initializing first and second downhole instruments for data transmission, the first and second downhole instruments being spaced apart, and the first and second instruments including respective first and second transmitters;
 measuring a first downhole parameter with the first downhole instrument;
 measuring a second downhole parameter with the second downhole instrument;
 transmitting first data relative to the first downhole parameter at a first time from the first transmitter to the surface via a communications medium; and
 transmitting second data relative to the second downhole parameter at a second time from the second transmitter to the surface via the communications medium such that the first data is interleaved with the second data.

30. The method of claim 29, wherein the step of substantially simultaneously initializing the first and second downhole instruments further comprises substantially simultaneously providing power to the first and second downhole instruments.

31. The method of claim 29, wherein the step of substantially simultaneously initializing the first and second downhole instruments further comprises substantially simultaneously alternating voltage supplied to the first and second downhole instruments.

32. The method of claim 29 wherein the step of transmitting first data further comprises employing frequency shift keying to transmit the first data.

33. The method of claim 29 wherein the step of measuring the first downhole parameter further comprises measuring at least one of temperature, position, pressure, differential pressure and density.

34. The method of claim 29 wherein the step of measuring the second downhole parameter further comprises measuring a same parameter as the first downhole parameter.

35. The method of claim 29 wherein the step of measuring the second downhole parameter further comprises measuring a different parameter from the first downhole parameter.

36. A method for transmitting downhole data to the surface comprising the steps of:
 measuring a first downhole parameter at a first downhole instrument, the first instrument including a first transmitter;
 measuring a second downhole parameter at a second downhole instrument, the second downhole instrument being spaced apart from the first downhole instrument, and the second instrument including a second transmitter;
 transmitting first data relative to the first downhole parameter from the first transmitter to the surface via a first time slot of a first frame; and
 transmitting second data relative to the second downhole parameter from the second transmitter to the surface via a second time slot of the first frame.

37. The method of claim 36 further comprising a step of substantially simultaneously initializing the first and second downhole instruments for data transmission.

38. The method of claim 36 further comprising a step of providing a second frame having a third time slot for transmitting the first data to the surface.

39. The method of claim 38 further comprising a step of transmitting the first data in the second frame in response to an event selected from a group consisting of temperature change, position change, pressure change, differential pressure change and density change.

40. The method of claim 36 further comprising a step of, responsive to a timing error, reinitializing the first and second downhole instruments.

41. The method of claim 40 further comprising a step of detecting the timing error from a group consisting of a leading first time slot, a lagging first time slot, a leading second time slot and a lagging second time slot.

42. The method of claim 40 wherein the step of reinitializing the first and second downhole instruments further comprises cycling power OFF and ON to the first and second downhole instruments.

43. The method of claim 40 wherein the step of reinitializing the first and second downhole instruments further comprises alternating voltage to the first and second downhole instruments.

44. The method of claim 36 wherein the step of transmitting the first data further comprises employing frequency shift keying to transmit the first data.

45. The method of claim 36 wherein the step of measuring the first downhole parameter further comprises measuring at least one of temperature, position, pressure, differential pressure and density.

* * * * *